Nov. 11, 1969  B. J. MAYLAND ET AL  3,477,832
PROCESS FOR THE CATALYTIC STEAM REFORMING OF NAPHTHA AND
RELATED HYDROCARBONS
Filed June 5, 1964  2 Sheets-Sheet 2

INVENTOR.
BERTRAND J. MAYLAND AND CARL ROBERT TRIMARKE
AND RICHARD L. HARVIN AND CHARLES S. BRANDON,
BY
Youngblut, Melville, Strasser & Foster,
ATTORNEYS.

United States Patent Office 3,477,832
Patented Nov. 11, 1969

3,477,832
PROCESS FOR THE CATALYTIC STEAM REFORMING OF NAPHTHA AND RELATED HYDROCARBONS
Bertrand J. Mayland, Jeffersontown, and Carl Robert Trimarke, Richard L. Harvin, and Charles S. Brandon, Louisville, Ky., assignors to Girdler Corporation, Louisville, Ky., a corporation of Ohio
Filed June 5, 1964, Ser. No. 372,862
Int. Cl. C10k 3/06
U.S. Cl. 48—213         11 Claims

ABSTRACT OF THE DISCLOSURE

A process for the production of hydrogen and crude synthesis gas by the steam reformation of naphtha and related hydrocarbons, wherein the hydrocarbonaceous material containing unsaturated hydrocarbons and sulfur compounds is vaporized and mixed with hydrogen. The mixture is treated so as to saturate unsaturated hydrocarbons therein and to convert sulfur compounds to hydrogen sulfide, said treatment being conducted in the presence of a hydrodesulfurization catalyst at a temperature not exceeding about 650° F. Hydrogen sulfide is removed, steam is added to the mixture and the mixture is subjected to a steam reformation reaction in the presence of a reforming catalyst. Steps are taken to maintain the temperature of the mixture below about 650° F. until the reforming catalyst is reached, wherein steps are taken to raise the temperature of the mixture to reforming temperatures as rapidly as possible.

---

The application relates to the production of hydrogen or synthesis gas by the catalytic steam reformation of naphtha and related hydrocarbons. By "synthesis gas" is meant a mixture of nitrogen and hydrogen generally in a 1:3 ratio and suitable for the synthetic production of ammonia. The term "naphtha" as used herein relates, for example but without specific limitation, to a mixture of hydrocarbons averaging $C_7$ in the molecule, containing branched and straight chain hydrocarbons, some aromatics and olefins, including both saturated and unsaturated hydrocarbons, and various impurities such as sulfur compounds, the mixture being generally liquid at room temperatures. The present invention is applicable both to naphthas as defined and to heavier related hydrocarbons; and some phases of the invention are of utility in the treatment of lighter hydrocarbons as well.

Until recently lighter hydrocarbons such as methane and propane were in plentiful supply in nearly all areas of the world where the production of hydrogen and synthesis gas was desired. Now, however, an increasing number of formerly under-developed areas are finding themselves in need of a supply of hydrogen or synthesis gas as a starting point for chemical processing. Many of these areas are completely devoid of a source of the lighter hydrocarbons such as are found in natural gas. In addition, various areas are experiencing a shortage or depletion of available lighter hydrocarbons. However, a petroleum fraction such as naphtha is usually available in reasonable proximity to areas which can support a hydrogen or synthesis gas plant.

The processing of naphtha and related heavier hydrocarbons has presented great difficulty, so that the partial oxidation process has been the only commercially feasible method of treating them. But such a process involves considerable capital expenditure as well as sizable utility costs.

The procedures hitherto applied to the reformation of the lighter hydrocarbons, e.g. those found in natural gas, have not been successful in the treatment of the heavier hydrocarbons. It is a basic object of this invention to provide satisfactory processes for the catalytic steam reformation of heavier hydrocarbons.

The steps of the processes hereinafter set forth are interrelated and coact; and it is an object of the invention to provide integrated procedures for the purpose described, starting with naphtha or related hydrocarbons and ending with the recovery of hydrogen or synthesis gases.

It is also an object of the invention to provide improvements in the individual steps making up the integrated procedures aforesaid, all as will later be more fully explained, together with apparatus suitable for carrying out the invention.

These and other objects of the invention, which will be set forth hereinafter or will be apparent to one skilled in the art upon reading these specifications, are accomplished by that series of process steps of which exemplary embodiments will now be described. Reference is made to the accompanying drawings wherein.

Naphthas and related hydrocarbons contain varying amounts of unsaturated hydrocarbons, aromatics and sulfur compounds which render them unsuitable for steam reformation. The deleterious effects of the presence of sulfur in a steam reforming reaction have hitherto been observed; but the prior workers with light hydrocarbons have endeavored to remove sulfur by passing the gaseous hydrocarbons at substantially ambient temperatures (90° to 120° F.) over a suitable adsorbent. This would not serve for naphtha and related hydrocarbons as herein set forth not only because of the low temperatures involved at which the heavier hydrocarbons are in the liquid state but also because the sulfur in such hydrocarbons is not generally in the form of hydrogen sulfide. While desulfurized naphthas are not new per se, the attainment of the objects of this invention requires an inexpensive and simple procedure which may be practiced at the plant site for eliminating the sulfur content of the raw naphtha and for converting unsaturated hydrocarbons into saturated compounds therein.

It has been found that by preheating and vaporizing the naphtha, mixing it with hydrogen (which may be a recycled portion of the end product hydrogen) and passing the mixed gases under proper operating conditions into contact with a suitable catalyst, simultaneously to saturate the unsaturated hydrocarbons in the mixture and to convert the sulfur in the sulfur compounds to hydrogen sulfide. These reactions as well as the adsorption hereinafter described can be carried on efficiently at elevated temperatures, preferably of the order of 600° F. It has been noted, however, in the development of this invention that naphthas and related hydrocarbons both before and after purification are subject to degradation when exposed to temperatures in excess of about 650° F. Accordingly, all vaporization, preheating and pretreatment should take place at a somewhat lower temperature level.

Figure 1:
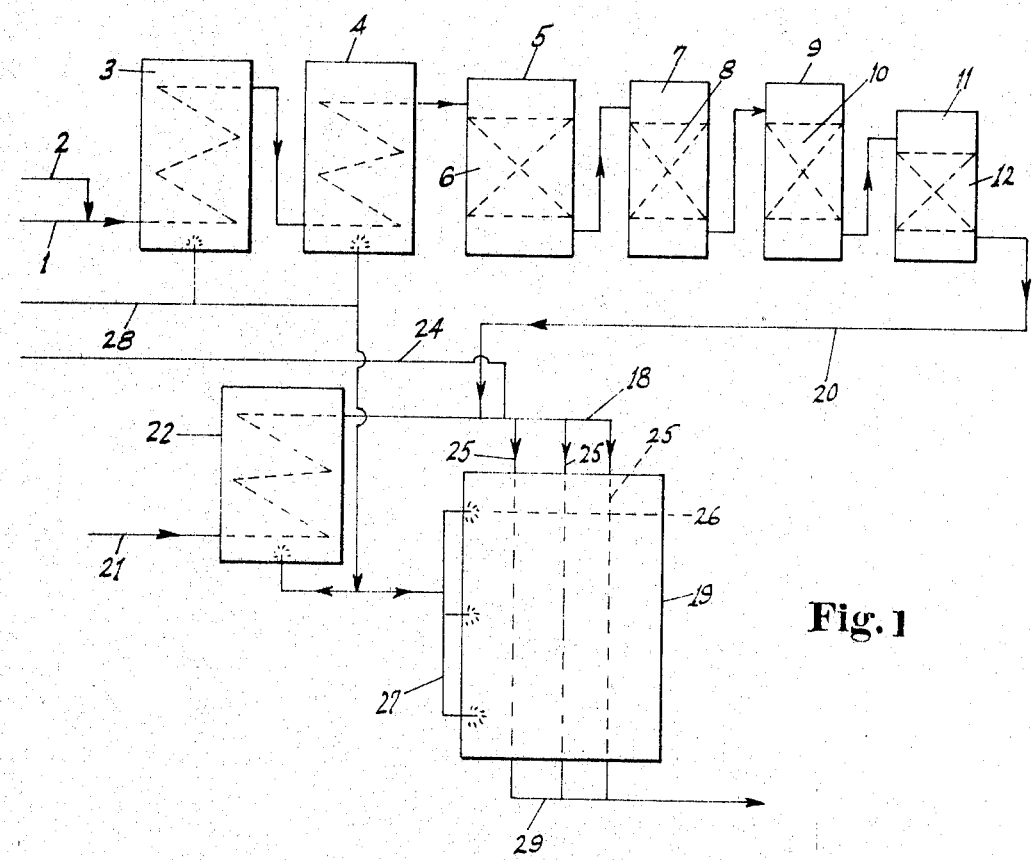
FIG. 1 is a flow diagram of one variant of the procedure of the invention.

Referring now to FIG. 1, the raw naphtha or related hydrocarbonaceous material in conduit 1 is mixed with hydrogen in conduit 2 and fed into a vaporizer 3 where, under the influence of heat, the naphtha is converted to the gaseous state. The mixture of hydrogen and naphtha should be at a pressure of about 150 to about 200 p.s.i.g. attainable by the use of suitable pumps (not shown). The temperature of the mixed material is preferably raised by the vaporizer 3 or by a supplementary preheater 4 from about 500° to about 600° F., but in no event above about 650° F.

The amount of hydrogen mixed with the naphtha can be proportioned to the quantities of unsaturates, aromatics and sulfur-bearing compounds in the raw feed stock; but in general, the use of 250 s.c.f. per barrel of naphtha will be found sufficient. As indicated above, the hydrogen may be derived from the end product of the process or from any suitable source.

The heated and now gaseous mixture is sent to a first stage reactor 5 which contains a bed 6 of catalyst. It has been found that a cobalt-molybdenum catalyst on a suitable heat resistant support, where the catalyst is in the form of small rods or other shapes which will permit a space velocity of about 3,000, based on the total feed gas, will convert most of the olefins to saturated hydrocarbons and will convert sulfur present to hydrogen sulfide. The catalyst bed will be contained in a suitable vessel located in an insulated chamber or furnace or other means permitting temperature control; and one excellent way of adjusting temperature is to control the temperature of the vaporizer in such a way that the exit gases from the reactor will be at about 600° F.

The gaseous mixture from the first stage reactor 5 will flow to and through a bulk sulfur removal vessel 7 which includes a bed 8 of iron oxide adsorbent. The reaction temperature in the vessel will preferably be maintained at about 600° F. With proper space velocity, the effluent gas from the vessel 7 will contain less than 10 p.p.m. of hydrogen sulfide.

The use of a second stage reactor 9 may be practiced at this point to effect complete hydrogenation of an unsaturated hydrocarbons and complete conversion of any sulfur present to hydrogen sulfide. The conditions in the second stage reactor (including the catalyst 10) may be the same as those described with reference to the first reactor 5. The second reactor may receive the treated gases directly from the bulk sulfur removal vessel 7, and deliver the further treated gases to a second sulfur removal vessel 11 containing a bed 12 of zinc oxide. The effluent gases from vessel 5 will be found to be free of all but minute traces of unsaturated hydrocarbons, and to contain substantially less than 1.0 p.p.m. of hydrogen sulfide.

The iron oxide adsorber in the vessel 7 can be regenerated with steam if desired.

The pretreated naphtha or related hydrocarbonaceous material may at this point be cooled so as to be condensed and returned to the liquid form with the venting of uncondensable gases. Or, the gaseous mixture may be transferred directly to the steam reforming step which will later be described.

Figure 2:
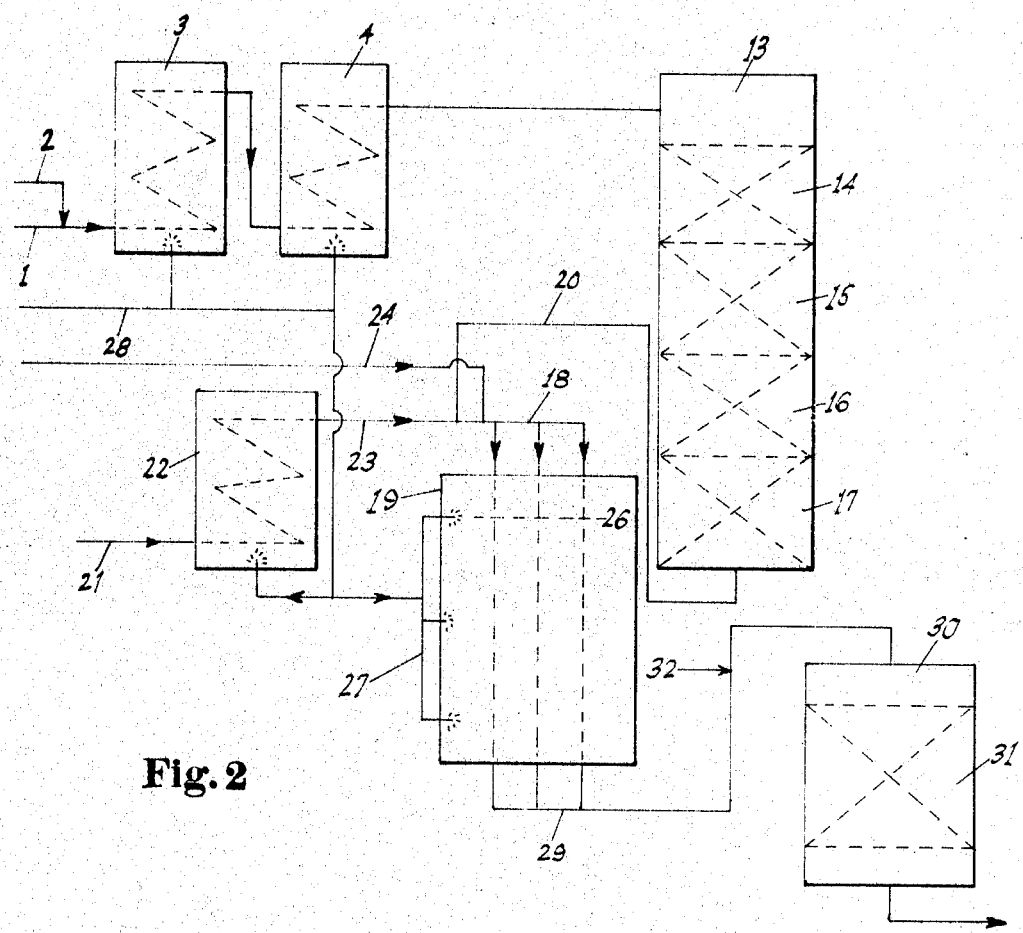
FIG. 2 is a flow diagram of another variant of the procedure, showing the use of a single vessel for hydrodesulfurization and the adsorption of hydrogen sulfide, and also showing the use of a second stage reformer.

The steps of subjecting the naphtha or related hydrocarbonaceous stocks to catalytic action in the presence of hydrogen for saturating unsaturated hydrocarbons and for the conversion of sulfur-bearing compounds to hydrogen sulfide, together with the use of suitable adsorbents for the elimination of sulfur, are referred to collectively herein by the term "hydrodesulfurization." Carrying on the hydrodesulfurization at an elevated temperature as herein taught, permits the use of a single vessel containing alternate layers of the catalyst and the hydrogen sulfide adsorption media in place of the first and second stage reactors 5 and 9 and the separate adsorption devices 9 and 11. This is illustrated in FIG. 2 wherein like parts are given like index numerals. But it will be noted that following the preheater 4 there is an elongated vessel 13 which contains spaced layers 14 and 16 of hydrodesulfurization catalyst, an intermediate layer 15 of hydrogen sulfide adsorber and a final layer 17 of hydrogen sulfide adsorber. It will be understood that a greater number of layers of the several substances may be employed in a single vessel if desired, and that the adsorption media may be the same or different in the adsorption layers, e.g. there may be one or more layers of iron oxide followed by a layer or layers of zinc oxide. Also, it will be understood that the use of an admixed catalyst wherein layers 14 and 15 are combined may be desirable in certain instances.

The use of a vessel such as that diagrammatically illustrated at 13 in FIG. 2 accomplishes a considerable saving in capital outlay, makes the entire unit much more compact, and effects greater heat economy. To the extent that the adsorption media are regenerable, as by a steam treatment, such regeneration may be accomplished in the vessel 13 without substantial harm to the hydrodesulfurization catalyst.

For the steam reformation of light hydrocarbons, a nickel-bearing catalyst has been found reasonably satisfactory. It has hitherto been found that such a catalytic material tends to promote cracking of the hydrocarbons and excessive carbon deposition, however, when naphtha and related hydrocarbons are subjected to a steam reformation treatment. This clogs the bed, diminishes the free passage of gases, and inhibits catalytic activity even with naphthas and related hydrocarbons purified as above described.

This particular aspect of the commercially available nickel-bearing catalyst would not be too serious, since it occurs over an extended period, if it were not for the fact that a certain amount of catalyst spalling and dusting also results. Furthermore, upon the passage of steam over the catalyst, to bring about the removal of the carbon, the rate of disintegration increases. This is caused by the reaction between the carbon and steam bringing about a sudden volumetric increase in the interstices of the catalyst resulting in damage to the integrity of the particles.

The tendency toward cracking and carbon deposition and resultant spalling and dusting of the catalyst can be ameliorated by treatment of the nickel-bearing catalyst. This can be accomplished by several methods, both singly and in combination. Published literature reveals that the prior art teaches the use of compounds of alkali metal such as sodium, potassium, lithium, cesium, and rubidium. To be sure, nickel-bearing catalysts treated with an alkali metal compound exhibit improved longevity characteristics. However, it has been found that if the nickel-bearing catalyst is first subjected to calcination and afterwards treated using a plurality of additive compounds, results are obtained which are decidedly superior to those obtained when only a single alkali metal compound is employed.

Calcination greatly improves the ability of the catalyst to withstand spalling and disintegration in the event that carbon is formed through mal-operation. This is attributable to the face that calcination reduces the porosity of the catalyst which effectively reduces the amount of carbon that can penetrate the intersitial spaces of the particles.

Proper selection and application of the additive compounds including the alkali metals will not only result in increased resistance to carbon deposition as a result of their greater selectivity, but will more than offset any loss in activity brought about by the calcination of the catalyst. Catalysts conforming to the aforementioned criteria are disclosed in the copending application of Mayland et al. Ser. No. 395,005, now Patent No. 3,391,089, filed Sept. 8, 1964 and entitled Catalysts for the Steam Reforming of Naphtha and Related Hydrocarbons and Processes for Making Them.

The steam reformation reaction is endothermic so that heat must be supplied through the use of a suitable furnace. There are various types of furnaces which may be employed such as that disclosed in the copending application of Reed and Comley, Ser. No. 287,572, filed June 13, 1963, now abandoned or the copending application of Herp, et al. entitled Modular Reforming Furnace, Ser. No. 377,942, filed June 25, 1964.

In general, suitable furnaces comprise a housing lined on its inner surfaces with refractory or heat resistant substances. Heat is furnished by a series of burners for suitable fuel, preferably of the type which will direct the flames laterally so as to heat up the furnace walls. Catalyst filled tubes within the furnace are thus heated primarily by radiation from the furnace walls and without direct flame impingement.

In the exemplary and preferred furnaces, the catalyst filled tubes run vertically, being connected at their bottom ends to outlet manifolds and having means at their top ends for connection to inlet manifolds, this arrangement of tubes and manifolds being generally referred to as a "harp."

The bare provision of a catalyst, treated as above described, is not sufficient alone for the purposes of this invention. A highly active and very selective catalyst must be used; but the catalyst particles should be of a much smaller size than usually employed; the heat fluxes should be higher than current in the art of steam reforming the lighter hydrocarbons; the space velocities should be greater; and higher temperatures should be used in the upper 25% of the catalyst "bed."

For example, the size of the catalyst particles should preferably be about ¼" x ¼" or smaller, in the form of cylinders, tablets or the like, at least in the upper 25% of the catalyst bed. Small sized catalyst particles result in greater surface area per unit of catalyst volume with a consequent increase in activity. The tendency toward a greater pressure drop throughout the length of the catalyst bed in the catalyst tubes may be offset by using catalyst particles in graduated sizes and/or by using tubes which are shorter than hitherto generally employed, namely, of the order of 10 feet in length.

The high rate of energy input to the upper portions of the catalyst tubes (which is important in overcoming the tendency of the naphtha toward simple cracking rather than reformation) is accomplished by carrying on an exothermic reaction in the tube entrance portions. One way of accomplishing this is to introduce some oxygen or air into the stream of vaporized, purified naphtha or like hydrocarbonaceous material at the entrance to the reforming furnace. The oxygen will react with some of the hydrocarbonaceous material in the feed stream exothermically so as to supply additional heat at the inlet to the catalyst bed. The skilled worker in the art will understand that the choice of air or oxygen can be made in the light of the ultimate product desired. The use of air will result in the introduction of nitrogen which is desirable in synthetis gases, whereas if the product is to be hydrogen in as pure a form as possible, the use of oxygen will be indicated.

One of the byproducts of the steam reformation of hydrocarbonaceous materials is a small quantity of residual methane. It has been discovered in the practice of this invention that the residual methane content of the reformed gas, contrary to expectations, does not increase in proportion to the space velocity of the gases through the catalyst tubes. It is true that at excessive space velocities, some of the vaporized hydrocarbonaceous gases may pass through the catalyst tubes without reformation; but this will be accompanied by only a nominal increase in the methane content. As such, the process thus far described provides an excellent way of effecting the steam reformation of hydrocarbonaceous materials without the generation of the usual quantities of methane.

The operation is preferably so carried on that the amount of unreformed hydrocarbonaceous gases at the exit end of the catalyst tubes will be nugatory. However, secondary reformation may be practiced in addition to primary reformation without departing from the spirit of the invention. Normally, secondary reformation has for its object the completion of the reforming reaction; but in this instance, where the content of undissociated hydrocarbonaceous material in the gases reaching the secondary reformer is very low, it will generally be practiced for the purpose of injecting additional air into the gas stream so as to adjust the hydrogen-nitrogen ratio in those instances where synthesis gas is the desired product. External heat does not need to be applied to bring about this reaction and it may, therefore, be carried on in a simple vessel which provides a bed of the reforming catalyst. Secondary reformation is beneficial in ultra high pressure operations where exceedingly high space velocity can be attained in the primary reformer.

The degradation of treated naphthas and related hydrocarbons at temperatures above about 650° F. has already been mentioned. It is possible to avoid such degradation; but it may be preferable to treat the vaporized feed stock with a hydrogenation catalyst just before it is reformed.

These considerations lead to the use of a plurality of catalysts in sequence; and it has been found possible to gain the desired results by arranging layers of different catalysts in the catalyst tubes of the reformation furnace.

Referring again to FIG. 1, the treated naphthas and related hydrocarbons are shown as being carried to the entrance manifold 18 of the reforming furnace 19 by a conduit 20. Steam from a source not shown is carried by a conduit 21 to a superheater 22 and thence by means of a conduit 23 into the manifold 18 for admixture with the vaporized hydrocarbons. An inlet conduit 24 for air or oxygen is also shown as connected with the manifold 18.

The representation of the reforming furnace 19 is purely diagrammatic. Dotted lines within the enclosure indicate catalyst filled tubes 25. These tubes above the dotted line 26 may contain the same type of catalyst as has been described in connection with the hydrodesulfurization. Below this line, the tubes may be filled with the steam reforming catalyst, the preparation and characteristics of which have been described above.

The degradation of naphthas and related hydrocarbons will occur at temperatures above about 650° F. As a consequence, the temperature of the gases should not be raised much above about 650° F. until the gases reach the steam reformation catalyst. Where a bed of hydrodesulfurization catalyst is employed ahead of the bed of steam reformation catalyst, too great a temperature rise in the gases before they reach the steam reformation catalyst may be avoided by introducing the air or oxygen at a point substantially following the passage of the vaporized hydrocarbonaceous material through the hydrodesulfurization catalyst but at the top of or within the first 25% of the depth of the steam reformation catalyst bed. The gases, when in contact with the last mentioned bed, may be very substantially raised in temperature, as hereinafter set forth.

The vaporizer 3, the hydrocarbon preheater 4, the furnace 19 and the steam preheater 22 may all be heated by means of burners supplied with any suitable mobile fuel through a conduit 27 branched as shown; and the fuel may be derived from a conduit 28 which also feeds elements 3, 4 and 22.

FIG. 1 also indicates diagrammatically at 29 an outlet manifold to which the catalyst tubes 25 are connected. The apparatus indicated in FIG. 1 employs a single stage reformation furnace and is suitable for the production of hydrogen or reformer type gas. The gases from the manifold 29 may subsequently be treated in any way desired, as for the removal of water vapor, oxides of carbon and the like.

The amount of steam added to the vaporized naphthas or other hydrocarbons before entry into the reforming furnace will generally be such as to give steam-to-carbon ratios of about 4.0:1 to about 7.5:1.

It is desirable, nevertheless, to heat the gases as rapidly as possible. The gases reach the entrance portion of the steam reformation catalyst bed, say, at a temperature not greatly in excess of 650° F. But despite the endothermic nature of the steam reformation reaction, the temperature of the gases in the steam reformation catalyst bed should rise to the range of about 1350° to about 1450° F. This is accomplished by heat transfer from the furnace through the walls of the catalyst tubes and by the heat generated by the combination of oxygen and hydrocarbonaceous materials.

It has been found that, with the naphtha or related hydrocarbonaceous material pretreated as above described and with the treatment of the catalyst also above described, continuous operation can be achieved at space velocities as high as 4600/hr., the heat flux by computation being about 25,000 B.t.u./hr./ft.$^2$. Runs have also been made at space velocities approaching 7000/hr. with a corresponding heat flux of 52,000 B.t.u./hr./ft.$^2$.

Continuous operations under circumstances such as those outlined imply preservation of the physical form and activity of the catalyst as well as prevention of carbon deposition such as would increase the pressure drop across the reformer. Indeed, it has been shown that catalysts treated as herein taught exhibit superior activity in addition to resistance to spalling and carbon deposition.

It may further be pointed out that the process is remarkably stable and the catalyst remarkably long-lived. Conditions have been encountered in which, due to some malfunction of other parts of the apparatus, naphtha was inadvertently fed to the reformer in the absence of steam, or naphtha was fed to the reformer without an adequate pretreatment and while still containing considerable quantities of unsaturated hydrocarbons. Under these circumstances, the result was heavy carbon deposition accompanied by some spalling of the catalyst, resulting in a pressure drop across the reformer. Where the condition is not too aggravated, and where insufficient spalling of the catalyst has occurred to create in itself a serious pressure drop, the catalyst may be restored to operating condition by steaming. But even in those instances where a considerable quantity of the catalyst has been destroyed by spalling, it has been found possible to empty the reactor tubes and salvage much of the catalyst by screening. The catalyst so salvaged can be mixed with fresh catalyst to make up the volume difference and replaced in the reactor tubes.

FIG. 2, in addition to showing the use of a single vessel 13 for a plurality of stages of hydrodesulfurization, also illustrates the use of a second stage reforming vessel 30. The vessel itself may be a simple device in which the gases from the reforming furnace may be brought into contact with a bed of the steam reformation catalyst. A furnace is not required in connection with the second stage reformer because comparatively little reforming remains to be done, and the reaction with air will generate sufficient heat to overcome heat losses and to raise the temperature of the gases into the range of about 1625° to 1650° F. Air will be introduced through the conduit 32 for the reaction.

The apparatus of FIG. 2 may be adapted to the manufacture of synthesis gases in substantially the proportions of hydrogen and nitrogen required for the production of ammonia.

Modifications may be made in the invention without departing from the spirit thereof. While the higher temperatures at the entrance ends of the catalyst tubes in the reformer furnace are preferably attained by combustion as herein taught, it does not amount to a departure from the spirit of the invention to employ catalyst tubes which, at least in their entrance portions, contain spacer cores (not shown) whereby to reduce the distance through which the furnace heat must travel, or to employ a furnace construction in which means are provided, such as fins, to increase the rate of heat transfer at the entrance end portions of the catalyst tubes. The invention having been described in certain exemplary embodiments, what is claimed as new and desired to be secured by Letters Patent is:

1. A process for the production of hydrogen and crude synthesis gas by the steam reformation of naphtha and related hydrocarbons, which process comprises the steps of vaporizing hydrocarbonaceous material containing unsaturated hydrocarbons and sulfur compounds, mixing hydrogen with said vaporized material, treating the said mixture so as to saturate unsaturated hydrocarbons therein and to convert said sulfur compounds to hydrogen sulfide, conducting said saturation of unsaturated hydrocarbons and said conversion of sulfur compounds to hydrogen sulfide in the presence of a hydrodesulfurization catalyst at a temperature not exceeding about 650° F., removing hydrogen sulfide so formed, mixing steam with the so treated mixture and subjecting it to a steam reformation reaction in the presence of a catalytic material in particulate form and comprising a nickel-containing catalyst and a heat resistant support therefor, the said catalytic material having been treated in such a manner as to minimize carbon deposition.

2. The process claimed in claim 1 wherein the said hydrodesulfurization catalyst is a cobalt-molybdenum catalyst on a heat resistive support.

3. The process claimed in claim 2 wherein the hydrogen sulfide is removed by means of an adsorber, the saturation of unsaturated hydrocarbons, the conversion of sulfur compounds to hydrogen sulfide, and the removal of hydrogen sulfide, being carried on in a single vessel containing both the hydrodesulfurization catalyst and the adsorber.

4. The process claimed in claim 3 wherein the said hydrosulfurization catalyst and adsorber are in admixture in said vessel.

5. The process claimed in claim 3 wherein said hydrodesulfurization catalyst and said adsorber lie in alternating layers in the direction of movement of the vaporized hydrocarbonaceous material through said vessel.

6. A process for the production of hydrogen and gaseous mixtures by the steam reformation of naphtha and related hydrocarbons, which process comprises the steps of vaporizing hydrocarbonaceous material containing unsaturated hydrocarbons and sulfur compounds, mixing hydrogen with the said vaporized material, and passing the vaporized mixture so formed and at elevated temperature over catalytic material acting to promote the saturation of unsaturated hydrocarbons and the conversion of sulfur compounds to hydrogen sulfide, conducting said saturation of unsaturated hydrocarbons and said conversion of sulfur compounds to hydrogen sulfide in the presence of a hydrodesulfurization catalyst at a temperature not exceeding about 650° F., passing the treated mixture over an adsorber for hydrogen sulfide, and thereafter adding steam to the treated mixture and subjecting it to catalytic reformation in catalyst tubes, filled with a reforming catalyst, the entrance quarter length at least of said tubes being filled with a more finely divided and active reforming catalyst than the remaining lengths of said tubes.

7. The process claimed in claim 6 wherein an oxygen-bearing gas is added to the vaporized hydrocarbons adjacent the entrance ends of said catalyst filled tubes.

8. The process claimed in claim 6 wherein at the immediate entrance to said tubes there is placed a layer of cobalt-molybdenum hydrodesulfurization catalyst, the remaining length of said tubes containing a nickel bearing reforming catalyst.

9. The process claimed in claim 8 wherein the reformed materials are passed from said catalyst filled tubes to a second reformer containing a nickel bearing catalyst, air being mixed with the said reformed materials at the entrance to said second reformer.

10. The process claimed in claim 8 wherein the saturation of unsaturated hydrocarbons, the conversion of sulfur compounds into hydrogen sulfide, and the adsorption of hydrogen sulfide are carried on in a single vessel containing both a hydrodesulfurization catalyst and an adsorber.

11. The process claimed in claim 8 wherein an oxygen-bearing gas is introduced into said catalyst-filled tubes within the first 25% of said remaining length.

References Cited
UNITED STATES PATENTS

| | | | |
|---|---|---|---|
| 2,830,880 | 4/1958 | Shapleigh | 48—214 |
| 3,069,351 | 12/1962 | Davis | 208—214 |
| 3,077,448 | 2/1963 | Kardash et al. | 208—217 |
| 3,341,448 | 9/1967 | Ford et al. | 208—214 |

FOREIGN PATENTS 992,161  5/1965  Great Britain.

MORRIS O. WOLK, Primary Examiner

R. E. SERWIN, Assistant Examiner

U.S. Cl. X.R.

48—197, 214